US012609422B2

(12) United States Patent
Hu

(10) Patent No.: US 12,609,422 B2
(45) Date of Patent: Apr. 21, 2026

(54) BATTERY PACK

(71) Applicant: Nanjing Chervon Industry Co., Ltd.,
Nanjing (CN)

(72) Inventor: Guiwu Hu, Nanjing (CN)

(73) Assignee: Nanjing Chervon Industry Co., Ltd.,
Nanjing (CN)

( * ) Notice: Subject to any disclaimer, the term of this
patent is extended or adjusted under 35
U.S.C. 154(b) by 492 days.

(21) Appl. No.: 17/582,544

(22) Filed: Jan. 24, 2022

(65) Prior Publication Data

US 2022/0238970 A1 Jul. 28, 2022

(30) Foreign Application Priority Data

Jan. 26, 2021 (CN) .......................... 202110105015.4

(51) Int. Cl.
H01M 50/583 (2021.01)
H01M 50/105 (2021.01)
(Continued)

(52) U.S. Cl.
CPC ....... H01M 50/583 (2021.01); H01M 50/105
(2021.01); H01M 50/211 (2021.01);
(Continued)

(58) Field of Classification Search
CPC ............. H01M 50/211; H01M 50/502; H01M
50/581; H01M 50/533; H01M 50/583;
(Continued)

(56) References Cited

U.S. PATENT DOCUMENTS

| 2005/0077878 A1* | 4/2005 | Carrier | .................... B60L 53/18 |
| | | | 320/134 |
| 2007/0009794 A1* | 1/2007 | Takami | ................. H01M 4/505 |
| | | | 429/223 |

(Continued)

FOREIGN PATENT DOCUMENTS

| CA | 3042159 A1 | 5/2018 |
| CN | 212323124 U | 1/2021 |
| WO | 2020/253003 A1 | 12/2020 |

OTHER PUBLICATIONS

Mohiuddin, "PTC Fuses provide compact, resettable protection for
electronic devices", Resettable PTC fuses White Paper, Eaton
Electronics Division, <https://www.eaton.com/content/dam/eaton/
products/electronic-components/resources/brochure/eaton-resettable-
ptc-white-paper.pdf> (Year: 2020).*

(Continued)

*Primary Examiner* — Jessie Walls-Murray
(74) *Attorney, Agent, or Firm* — Greenberg Traurig, LLP

(57) ABSTRACT

A battery pack includes a cell assembly. The cell assembly
includes a cell assembly positive terminal, a cell assembly
negative terminal, a positive lead-out piece, a negative
lead-out piece, a discharge path, and a protective element.
The positive lead-out piece connects the cell assembly
positive terminal to a battery pack positive terminal. The
negative lead-out piece connects the cell assembly negative
terminal to a battery pack negative terminal. The protective
element is disposed on the discharge path. When the dis-
charge current of the discharge path is greater than or equal
to a preset current, the protective element turns off. The
length of one of the positive lead-out piece or the negative
lead-out piece close to the protective element is greater than
the length of the other one of the positive lead-out piece or
the negative lead-out piece away from the protective ele-
ment.

19 Claims, 11 Drawing Sheets

(51) Int. Cl.

| | |
|---|---|
| *H01M 50/211* | (2021.01) |
| *H01M 50/247* | (2021.01) |
| *H01M 50/296* | (2021.01) |
| *H01M 50/502* | (2021.01) |
| *H01M 50/51* | (2021.01) |
| *H01M 50/533* | (2021.01) |
| *H01M 50/543* | (2021.01) |
| *H01M 50/581* | (2021.01) |

(52) U.S. Cl.
CPC ....... *H01M 50/247* (2021.01); *H01M 50/296*
(2021.01); *H01M 50/502* (2021.01); *H01M 50/51* (2021.01); *H01M 50/533* (2021.01);
*H01M 50/543* (2021.01); *H01M 50/581*
(2021.01); *H01M 2220/30* (2013.01)

(58) Field of Classification Search
CPC .. H01M 50/296; H01M 50/51; H01M 50/574;
H01M 2200/106; H01M 10/0436; H01M
10/425; H01M 10/482; H01M 50/238;
H01M 50/284; H01M 50/519; H01M
50/105; H01M 50/26
See application file for complete search history.

(56) References Cited

U.S. PATENT DOCUMENTS

| | | | | |
|---|---|---|---|---|
| 2007/0026315 A1* | 2/2007 | Lampe-Onnerud | ... | H01M 4/525 |
| | | | | 429/231.1 |
| 2007/0037045 A1* | 2/2007 | Takeshita | ............. | H01M 50/211 |
| | | | | 429/96 |
| 2011/0008651 A1* | 1/2011 | Park | .................... | H01M 50/528 |
| | | | | 429/7 |
| 2012/0105001 A1* | 5/2012 | Gallegos | ................. | B60L 53/66 |
| | | | | 320/109 |
| 2015/0064519 A1* | 3/2015 | Hong | .................... | H01M 50/55 |
| | | | | 429/62 |
| 2015/0295283 A1* | 10/2015 | Eom | ................... | H01M 10/425 |
| | | | | 429/61 |
| 2018/0151863 A1* | 5/2018 | Kim | .................... | H01M 50/503 |
| 2018/0366697 A1* | 12/2018 | Elfering | ............. | H01M 50/516 |
| 2020/0152950 A1* | 5/2020 | Rodriguez | .......... | H01M 50/296 |
| 2022/0416553 A1* | 12/2022 | Geng | ................. | H01M 50/569 |
| 2023/0079717 A1* | 3/2023 | Peng | ................... | H01M 50/503 |
| | | | | 429/7 |

OTHER PUBLICATIONS

EPO, extended European search report issued on European patent application No. 22152860.7, dated Jun. 22, 2022, 7 pages.

CIPO, office action issued on Canadian patent application No. 3,146,686, dated Mar. 2, 2023, 5 pages.

* cited by examiner

BATTERY PACK

RELATED APPLICATION INFORMATION

This application claims the benefit under 35 U.S.C. § 119(a) of Chinese Patent Application No. CN 202110105015.4, filed on Jan. 26, 2021, which application is incorporated herein by reference in its entirety.

BACKGROUND

Based on the use requirement for portability, more and more power tools currently use battery packs as power sources.

The existing battery packs for supplying power to power tools mostly use cylindrical lithium batteries. Multiple cylindrical lithium batteries connected in series and in parallel ensure sufficient electric energy output so that the endurance capacity and operating efficiency of the power tools are improved.

However, with the continuous development of battery pack technology, the discharge current and charge current of a battery pack increase gradually. During use, the heat generation of components of the battery pack through which the currents flow increases gradually. The components include positive and negative terminal poles, circuit boards, and lead-out pieces connecting cells. Especially when a power tool keeps working for a while with a high current, the temperature on the components rises sharply, causing a problem about the safety and reliability of the battery pack. Additionally, the heat generation of the battery pack may shorten the life of the battery pack, raising the frequency for a user changing the battery pack and thus increasing the cost of use.

SUMMARY

A battery pack is provided. The battery pack includes a housing, a battery pack interface enabling the battery pack to be detachably connected to a power tool, and a cell assembly located in the housing. The battery pack interface includes a battery pack positive terminal and a battery pack negative terminal. The cell assembly includes a plurality of non-cylindrical cells. A cell includes a cell positive electrode and a cell negative electrode. The cell assembly includes a positive lead-out piece, a negative lead-out piece, a discharge path, and a protective element. The positive lead-out piece is connected in series between at least one cell positive electrode and the battery pack positive terminal. The negative lead-out piece is connected in series between at least one cell negative electrode and the battery pack negative terminal. The discharge path is configured to supply power to the power tool and consists of a cell assembly positive terminal, the positive lead-out piece, the battery pack positive terminal, a cell assembly negative terminal, the negative lead-out piece, and the battery pack negative terminal. The protective element is disposed on the discharge path. In response to the discharge current of the discharge path being greater than or equal to a preset current, the protective element turns off to disconnect the discharge path. The length of one of the positive lead-out piece or the negative lead-out piece close to the protective element is greater than the length of the other of the positive lead-out piece or the negative lead-out piece away from the protective element.

In one example, the protective element is connected between the positive lead-out piece and the battery pack positive terminal. The length of the positive lead-out piece close to the protective element is greater than the length of the negative lead-out piece away from the protective element.

In one example, the protective element is connected between the negative lead-out piece and the battery pack negative terminal. The length of the negative lead-out piece close to the protective element is greater than the length of the positive lead-out piece away from the protective element.

In one example, the cells are connected in series.

In one example, the positive lead-out piece and the negative lead-out piece are made of metal.

In one example, the cell assembly includes a first cell and a second cell. A positive electrode of the first cell is connected to a negative electrode of the second cell in series. The positive lead-out piece is connected to a positive electrode of the second cell. The negative lead-out piece is connected to a negative electrode of the first cell.

In one example, the discharge current of the battery pack is greater than or equal to 80 A.

In one example, the capacity of the battery pack is greater than or equal to 5 Ah.

In one example, the battery pack further includes a cell elastic piece disposed around the cell assembly.

A battery pack is provided. The battery pack includes battery pack terminals, a plurality of non-cylindrical cells, two lead-out pieces, and a protective element. A cell includes a cell output pole piece for outputting the electric energy of the cell. The two lead-out pieces are connected between the battery pack terminals and the cell output pole piece. The protective element is disposed between the battery pack terminals and the cell output pole piece. In response to the discharge current of the battery pack being greater than or equal to a preset current, the protective element turns off. One of the two lead-out pieces close to the protective element is defined as a first lead-out piece. The other of the two lead-out pieces away from the protective element is defined as a second lead-out piece. The length of the first lead-out piece is greater than the length of the second lead-out piece.

In one example, the cells are stacked in the up-down direction to form a cell assembly. The cell assembly has a first thickness in the up-down direction. The length of the first lead-out piece is smaller than or equal to the first thickness.

In one example, each of the cell has a second thickness in the up-down direction. The length of the second lead-out piece is smaller than or equal to the second thickness.

A battery pack is provided. The battery pack includes battery pack terminals, a plurality of non-cylindrical cells, and two lead-out pieces. A cell includes a cell output pole piece for outputting the electric energy of the cell. The two lead-out pieces are connected between the battery pack terminals and the cell output pole piece. One of the two lead-out pieces that has a first temperature in response to the battery pack discharging is defined as a first lead-out piece. The other of the two lead-out pieces that has a second temperature in response to the battery pack discharging is defined as a second lead-out piece. In response to the first temperature being greater than the second temperature, the length of the first lead-out piece is greater than the length of the second lead-out piece.

The present disclosure has the beneficial effect that the preceding technical solutions can reduce the heat generation of the battery pack, thus improving the safety and reliability of the battery pack and extending the service life of the battery pack.

DETAILED DESCRIPTION

The present disclosure is described hereinafter in detail in conjunction with drawings and examples.

Figure 1:
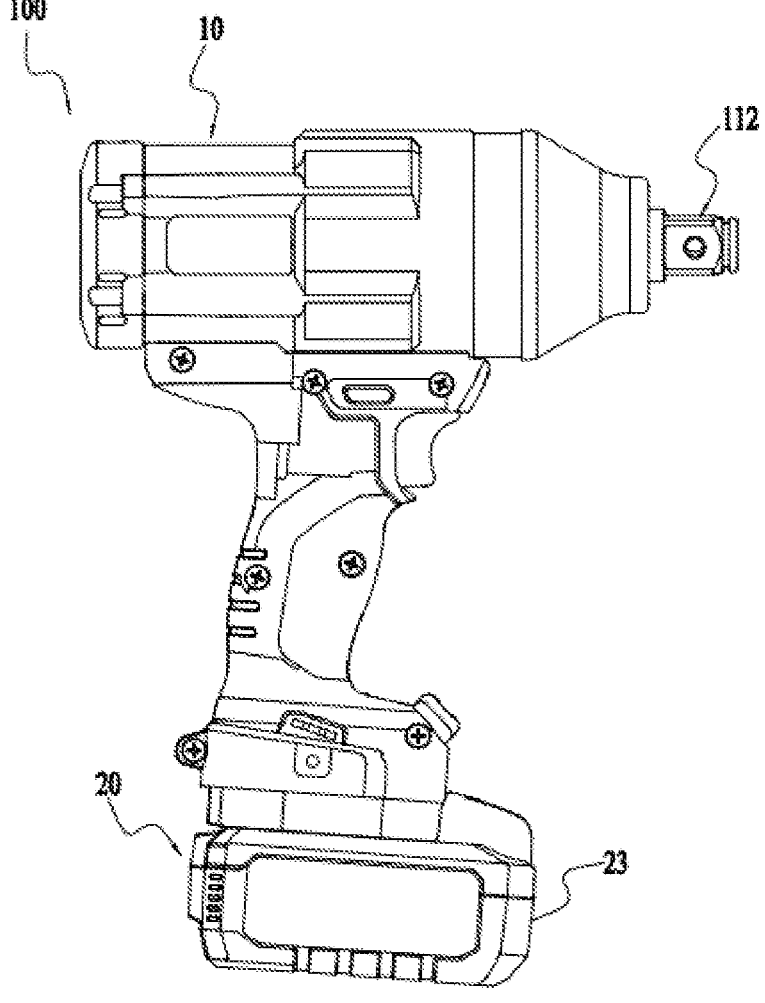
FIG. 1 is a view of a power tool system according to example one.

FIG. 1 illustrates a power tool system 100. The power tool system 100 includes a power tool 10 and a battery pack 20 that is adapted to the power tool 10 and supplies power to the power tool 10. In FIG. 1, the power tool 10 is an impact wrench. Although this example relates to an impact wrench, it is to be understood that the present application is not limited to the disclosed examples and is applicable to a power tool 10 of another type. The power tool 10 may be a gardening tool, for example, a string trimmer, a hedge trimmer, a blower, or a chainsaw. Alternatively, the power tool 10 may be a torque output tool, for example, an electric drill or an electric hammer. Alternatively, the power tool 10 may be a sawing tool, for example, an electric circular saw, a scroll saw, or a reciprocating saw. Alternatively, the power tool 10 may be a grinding tool, for example, an angle grinder or a sander.

Figure 2:
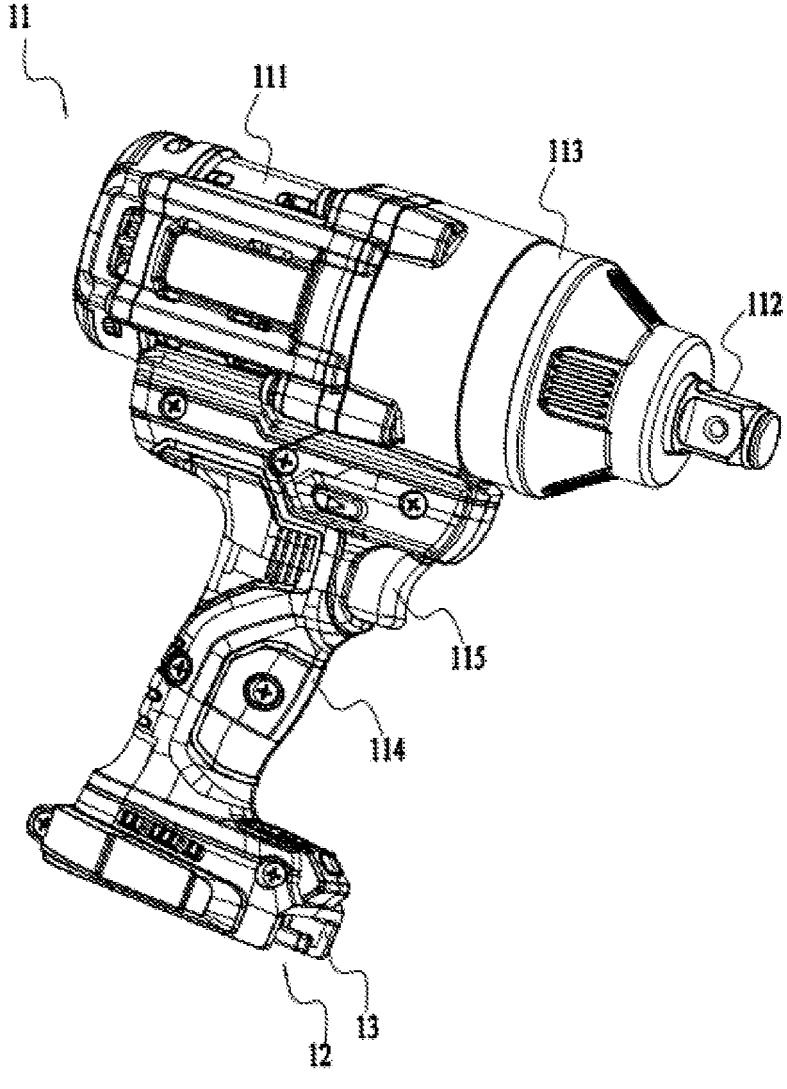
FIG. 2 is a perspective view illustrating the structure of the power tool in FIG. 1.

Referring to FIG. 2, the power tool 10 includes a tool body 11, a tool interface 12, and a tool matching portion 13. The tool interface 12 and the tool matching portion 13 are disposed on the tool body 11.

The tool body 11 includes a motor 111, an output shaft 112, and an impact mechanism 113. The output shaft 112 is driven by the motor 111. The impact mechanism 113 connects the motor 111 to the output shaft 112. The impact mechanism 113 is driven by the motor 111 and applies an impact to the output shaft 112. The body of the power tool 10 further includes a handle 114 that can be held by a user to operate the power tool 10. The handle is provided with a trigger switch 115. The trigger switch is configured to be driven by the user of the power tool 10 to start or stop the operation of the motor 111. Additionally, at the lower end of the handle 114, the power tool 10 is further provided with the tool interface 12 and the tool matching portion 13 that are configured to be detachably connected to the battery pack 20. In some examples, the tool matching portion 13 is configured to enable the battery pack 20 to be detached from the tool matching portion 13 when the user slides the battery pack 20 toward the front of the body of the power tool 10.

Figure 3:
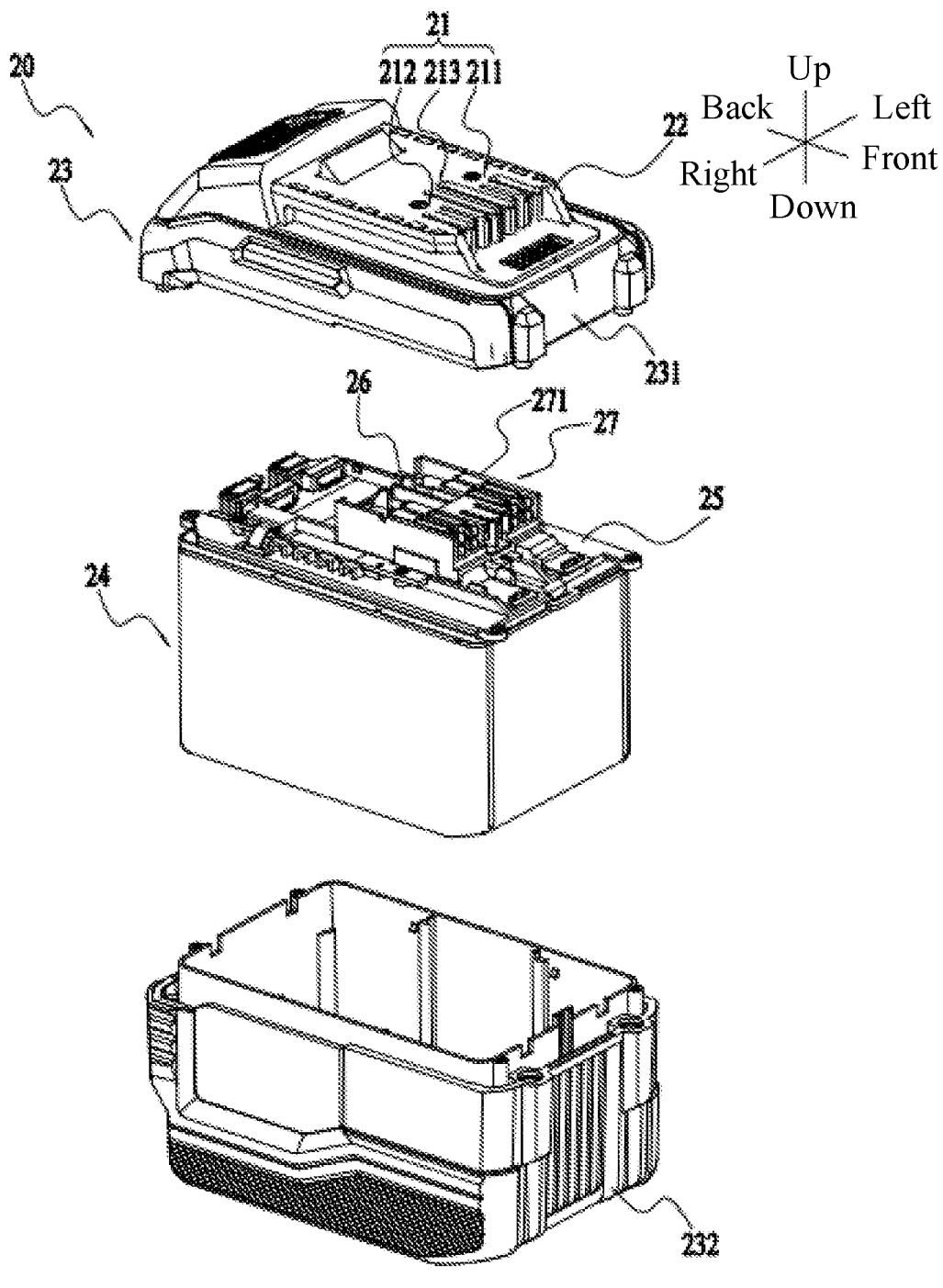
FIG. 3 is a view illustrating the structure of a battery pack according to example one.

In the preceding description, the up-down direction and the front-rear direction are illustrated as directions shown in FIG. 3.

Referring to FIG. 3, the battery pack 20 includes a housing 23, a cell assembly 24, a battery pack junction portion 22, and a battery pack interface 21. The voltage of the battery pack 20 is usually 10.8 V, 24 V, 36 V, 48 V, 56 V, or 80 V. The capacity of the battery pack 20 is greater than or equal to 5 Ah. Further, the capacity of the battery pack is greater than or equal to 9 Ah. The battery pack 20 is provided with the battery pack interface 21 and the battery pack junction portion 22. The battery pack interface 21 is configured to match the tool interface 12 to supply power to the power tool 10. The battery pack interface 21 can further match a charger 30 to enable the charger 30 to charge the battery pack 20. The battery pack junction portion 22 can be detachably connected to the tool matching portion 13 or the charger 30 so as to enable the battery pack 20 to supply power to the power tool 10 or enable the charger 30 to charge the cell assembly 24.

The housing 23 includes an upper housing 231 and a lower housing 232 that are assembled at the interfacial position to form an inner cavity. The inner cavity formed by the assembly of the upper housing 231 and the lower housing 232 is configured to secure and accommodate the cell assembly 24.

The cell assembly 24 is disposed in the inner cavity formed by the housing 23. The cell assembly 24 includes a plurality of cells 241. A cell 241 includes a cell tab 242. The cell tab 242 further includes a cell positive electrode and a cell negative electrode that are configured to output the electric energy of the cell 241 or input electric energy for charging the cell 241. The cell assembly 24 further includes a cell assembly positive terminal and a cell assembly negative terminal that are configured to output the electric energy of the cell assembly 24 or input electric energy for charging the cell assembly 24. The cell assembly positive terminal is connected in series between at least one cell positive electrode and a battery pack positive terminal. The cell assembly negative terminal is connected in series between at least one cell negative electrode and a battery pack negative terminal. In general, the cells 241 are in series connection, in parallel connection, or in a combination of series connection and parallel connection to form the cell assembly 24. The voltage of a single cell 241 is 4.2 V. In some examples, the cell 241 is a cylindrical structure, for example, a 18650 battery. In some other examples, the cell 241 is a flat bag-like structure, and the cells 241 are stacked sequentially in the up-down direction. The cell 241 may also be bent into an arc-shaped structure, for example, a pouch-type battery pack. The cell 241 further includes a shell of the cell 241. For a cylindrical cell, a steel shell is usually used as the shell of the cell 241. For a pouch-type battery pack, an aluminum-plastic film is usually used as the shell of the cell 241. It is to be understood that the present application is not limited to the disclosed examples, and the structure of the cell 241 is not limited here.

The battery pack interface 21 is formed on one upper surface of the housing 23 and is at least electrically connected to the cell assembly 11 to establish the physical and electrical connection to the power tool. Specifically, the battery pack interface 21 is formed on the upper surface of the upper housing 231. In some examples, the battery pack interface 21 includes a power supply positive interface 211, a power supply negative interface 212, and a power supply communication interface 213. The battery pack 20 outputs electric energy through the power supply positive interface 211 and the power supply negative interface 212. The battery pack 20 communicates with the attached power tool or charger through the power supply communication interface 213. In a specific example, the housing is provided with two power supply positive interfaces 211 and two power supply negative interfaces 212. It is to be understood that the battery pack housing 23 may be provided with more or less power supply positive interfaces 211 and power supply negative interfaces 212 based on the electrical characteristics of the battery pack.

The battery further includes a first support plate 25, a main circuit board 26, and a terminal assembly 27.

Figure 4:
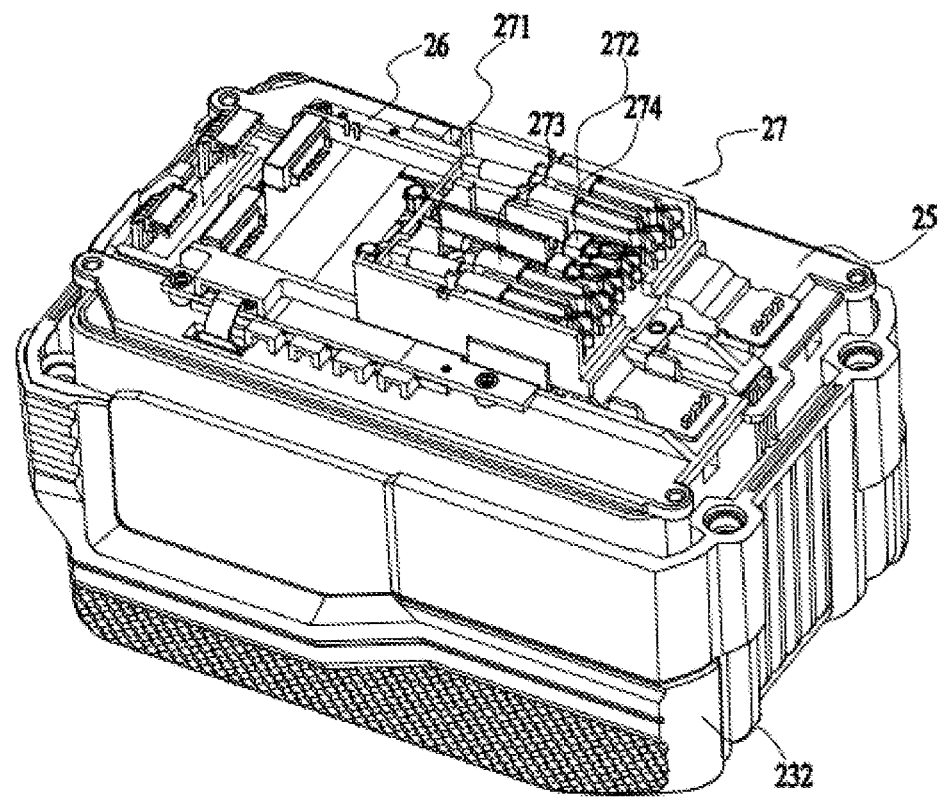
FIG. 4 is a view illustrating the structure of the battery pack shown in FIG. 3 with the upper housing removed.

The first support plate 25 is disposed on the upper side of the lower housing 232. The first support plate 25 and the lower housing 232 form an accommodation space to accommodate the cell assembly. Referring to FIG. 4, the first support plate 25 is detachably connected to the lower housing 232 to form the accommodation space to accommodate the cell assembly. Similarly, the first support plate 25 and the upper housing 231 form an accommodation space to accommodate components including the main circuit board 26 and the terminal assembly 27. Specifically, the first support plate 25 is a slab structure and is detachably connected to the lower housing 232.

The terminal assembly 27 includes battery pack terminals and a terminal support base 271. The terminal support base 271 is configured to accommodate and secure the battery pack terminals onto the first support plate 25. The battery pack terminals further include a battery pack positive terminal 272, a battery pack negative terminal 273, and a battery pack communication terminal 274. The battery pack positive terminal 272 is electrically connected to the cell assembly positive terminal, that is, at least one cell positive electrode, and is located in the power supply positive interface 211. The battery pack negative terminal 273 is electrically connected to the cell assembly negative terminal, that is, at least one cell negative electrode, and is located in the power supply negative interface 212. The battery pack positive terminal 272 and the battery pack negative terminal 273 are configured to match a tool terminal of the power tool 10 to output the electric energy of the cell assembly 24 to the power tool 10. Specifically, the electric energy of the cell assembly 24 passes through the cell assembly positive terminal and the battery pack positive terminal 272 to the tool interface of the power tool and the motor of the power tool and then passes through the battery pack negative terminal 273 and the cell assembly negative terminal to return to the cell assembly 24. Accordingly, the cell assembly 24, the battery pack terminals in the battery pack interface, and the motor 111 of the power tool form a discharge circuit. The motor 111 consumes the electric energy of the cell assembly 24 through the discharge circuit. Moreover, the battery pack communication terminal 274 is located in the power supply communication interface 213 and configured to communicate with the connected power tool 10 or the charger. As a specific example, the battery pack terminals clamp the tool terminal with elastic force from both sides in the left-right direction. Accordingly, in the process of installing the battery pack to the power tool, the tool terminal of the power tool is led by the battery pack interface and inserted into the battery pack terminals so that the tool terminal is clamped by the battery pack terminals, thus enabling the power tool 10 to be electrically connected to the battery pack 20.

The main circuit board 26 is disposed on the upper side of the first support plate 25, is connected in series between the cell assembly 24 and the battery pack interface 21, and is configured to collect an electrical signal related to the battery pack 20. In some examples, the main circuit board 26 is connected in series between the cell assembly 24 and the battery pack communication terminal 274 and is configured to transmit the information of the battery pack through the battery pack communication terminal 274 to the power tool 10 attached to the battery pack 20. The information of the battery pack includes the discharge current of the battery pack, the temperature of the cell assembly 24 and/or the temperature of the cell 241, the voltage of the cell 241, and the internal resistance value of the cell 241. Since the information of the battery pack is usually detected by a sensor, the battery pack 20 further includes one or more detection sensors. In some examples, a detection sensor may be a temperature sensor disposed on the surface of the cell assembly 24 or the surface of the cell 241. The temperature sensor may be specifically a thermistor. The detection sensor may also be a voltage sensor for detecting the voltage of the cell 241.

Figure 5:
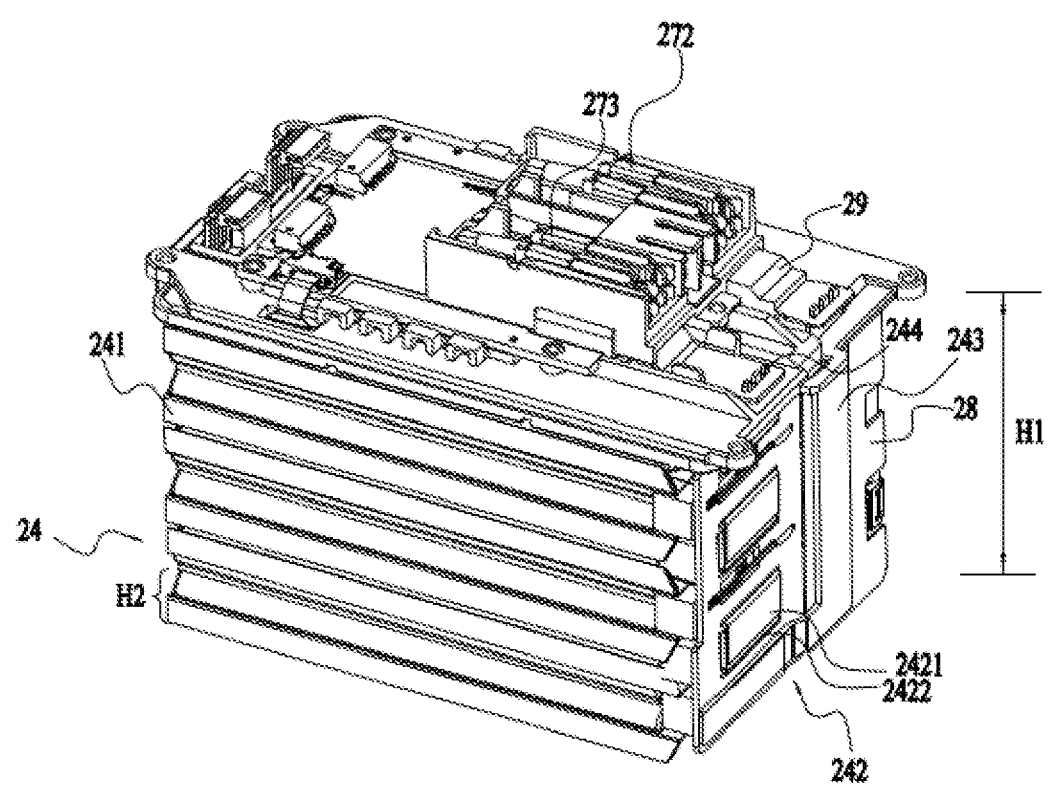
FIG. 5 is a view illustrating the internal structure of the battery pack shown in FIG. 3 with a housing and a cell elastic piece excluded.

Referring to FIG. 5, the battery pack 20 further includes a detection circuit board 28. The detection sensor is integrated on the detection circuit board 28. For ease of detection, the detection circuit board 28 is disposed on one side of the cell assembly where the cell tab 242 is located, that is, on one side of the cell assembly 24 where the cell positive electrode 2421 and the cell negative electrode 2422 are located. It is to be understood that the battery pack 20 further includes a sensor of another type so that the detection circuit board 28 collects the information of the battery pack through various sensors and transmits the collected information of the battery pack to the main circuit board 26, and through the battery pack communication terminal 274 to the attached power tool 10 or the charger. In some examples, the cell tabs 242, that is, the cell positive electrode 2421 and the cell negative electrode 2422, are disposed on the front end surface of the cell 241 or the rear end surface of the cell 241.

Additionally, the battery pack 20 further includes a protective element 29 disposed between the battery pack terminals and the cell tab 242. In response to the discharge current of the battery pack being greater than or equal to a preset current, the protective element 29 turns off. The cell assembly 24 further includes two lead-out pieces. The two lead-out pieces are made of metal and are connected between the battery pack terminals and the cell tab 242. In some examples, one lead-out piece (for example, a positive lead-out piece 243 as shown in FIG. 5) of the two lead-out pieces close to the protective element 29 is defined as a first lead-out piece, and the other lead-out piece (for example, a negative lead-out piece 244 as shown in FIG. 5) of the two lead-out pieces away from the protective element 29 is defined as a second lead-out piece. Here the length of the first lead-out piece is greater than the length of the second lead-out piece. The length of the first lead-out piece is a path length of the first lead-out piece on its extension path. The length of the second lead-out piece is a path length of the second lead-out piece on its extension path. The length of the first lead-out piece is a path length of the first lead-out piece on a discharge path. The length of the second lead-out piece is a path length of the second lead-out piece on the discharge path.

In some examples, the size of the first lead-out piece along the up-down direction is greater than the size of the second lead-out piece along the up-down direction.

In some examples, each of the cells 241 has a second thickness H2 in the up-down direction, and the plurality of cells 241 are stacked in the up-down direction to specifically form the cell assembly 24 so that the cell assembly 24 has a first thickness H1 in the up-down direction. Here the first thickness H1 is related to the number of the cells 241. Additionally, the length of the first lead-out piece is smaller than or equal to the first thickness H1. The length of the second lead-out piece is smaller than or equal to the second thickness H2.

Figure 6:
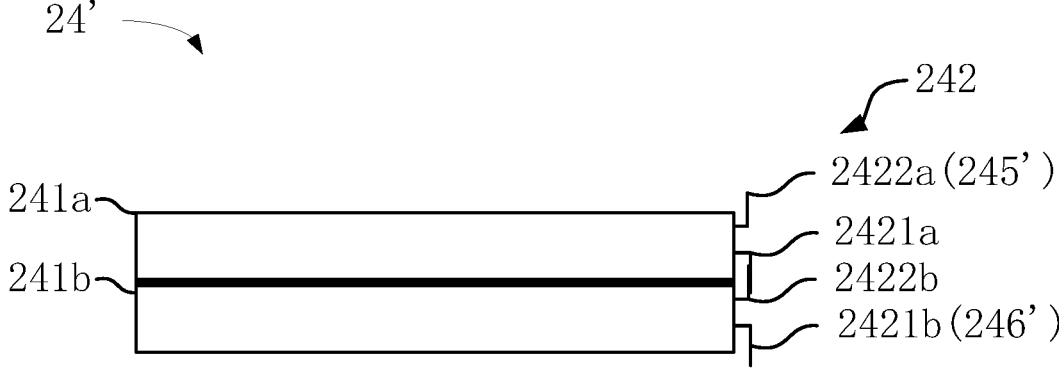
FIG. 6 is a view illustrating the structure of a cell assembly according to one example.

Specifically, the two lead-out pieces are the positive lead-out piece 243 and the negative lead-out piece 244 respectively. The positive lead-out piece 243 enables the cell assembly positive terminal to be connected to the battery pack positive terminal 272. The negative lead-out piece 244 enables the cell assembly negative terminal to be connected to the battery pack negative terminal. In this example, the plurality of cells 241 are connected in series to form the cell assembly 24. FIG. 6 is a view illustrating the structure of a cell assembly according to one example. Referring to FIG. 6, the cell assembly 24' includes at least a first cell 241a and a second cell 241b. Accordingly, a first cell positive electrode 2421a of the first cell is electrically connected to a second cell negative electrode 2422b of the second cell to enable the first cell and the second cell to be connected in series. A first cell negative electrode 2422a of the first cell is the cell assembly negative terminal 245' of the cell assembly 24'. A second cell positive electrode 2421b of the second cell is the cell assembly positive terminal 246' of the cell assembly 24'. In this example, the cell assembly positive terminal 246' is connected to the positive lead-out piece 243. The cell assembly negative terminal 245' is connected to the negative lead-out piece 244. With this arrangement, the cell assembly positive terminal 246', the positive lead-out piece 243, the battery pack positive terminal 272, the cell assembly negative terminal 245', the negative lead-out piece 244, and the battery pack negative terminal 273 form the discharge path that is in the battery pack 10 and is configured to supply power to the power tool 10. The positive lead-out piece 243 and the negative lead-out piece 244 are each a metal piece with a certain width so that the temperature does not rise rapidly when the positive lead-out piece 243 and the negative lead-out piece 244 output a large discharge current. Specifically, the width of the positive lead-out piece 243 and the width of the negative lead-out piece 244 are in the range of 5 mm to 40 mm. This arrangement enhances the heat dissipation effect of the positive lead-out piece 243 and the heat dissipation effect of the negative lead-out piece 244, thus reducing the heat generation of the battery pack in use, improving the safety and reliability of the battery pack, and extending the service life of the battery pack.

The protective element 29 is disposed on the preceding discharge path. The protective element 29 is configured to, in response to the discharge current of the discharge path being greater than or equal to the preset current, turn off to disconnect the discharge path so that the battery pack stops outputting electric energy to improve the safety of the battery pack. As a specific example, when the discharge current rises abnormally to the preset current, the protective element 29 gets fused to disconnect the discharge path. The protection element 29 may specifically be one of a plug fuse, a wrapped fuse, or a surface-mount fuse, which is not limited here.

Since the protective element 29 generates a great amount of heat in operation, the length of one of the positive lead-out piece 243 or the negative lead-out piece 244 close to the protective element 29 is arranged to be greater than the length of the other of the positive lead-out piece 243 or the negative lead-out piece 244 away from the protective element 29, further enhancing the heat dissipation effect of the battery pack 10 and reducing the effect of the heat generation of the protective element 29 on the cell assembly 24. In some examples, when the protective element 29 is connected between the positive lead-out piece 243 and the battery pack positive terminal 272, the length of the positive lead-out piece 243 close to the protective element 29 is greater than the length of the negative lead-out piece 244 away from the protective element 29. In some other examples, when the protective element 29 is connected between the negative lead-out piece 244 and the battery pack negative terminal 273, the length of the negative lead-out piece 244 close to the protective element 29 is greater than the length of the positive lead-out piece 243 away from the protective element 29. This arrangement helps with the heat dissipation of the battery pack, preventing the heat generated by the protective element 29 from being transmitted through the positive lead-out piece 243 or the negative lead-out piece 244 to the cells 241.

In some other examples, one lead-out piece (for example, the positive lead-out piece 243 as shown in FIG. 5) of the two lead-out pieces that has a first temperature in response to the battery pack 20 discharging is defined as a first lead-out piece, and the other lead-out piece (for example, the negative lead-out piece 244 as shown in FIG. 5) of the two lead-out pieces that has a second temperature in response to the battery pack 20 discharging is defined as a second lead-out piece. Accordingly, due to the existence of the protective element 29, in response to the first temperature being greater than the second temperature, the length of the first lead-out piece is greater than the length of the second lead-out piece. When the protective element 29 is disposed between the negative lead-out piece 244 and the battery pack negative terminal 273, the second temperature is greater than the first temperature and thus the length of the second lead-out piece is greater than the length of the first lead-out piece. This arrangement helps with the heat dissipation of the battery pack, preventing the heat generated by the protective element 29 from being transmitted through the first lead-out piece or the second lead-out piece to the cells 241.

Figure 7:
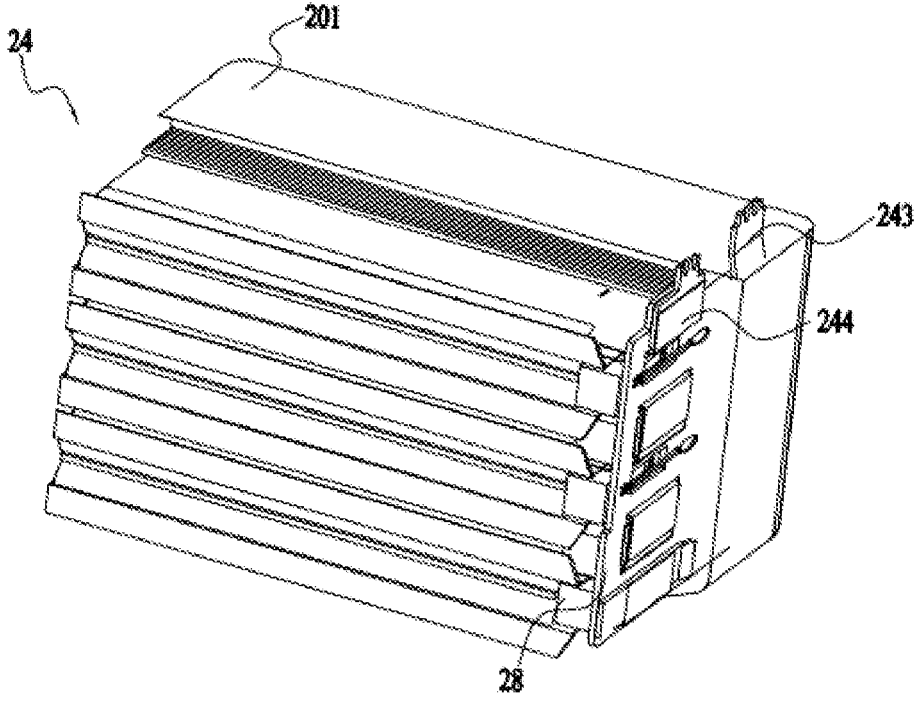
FIG. 7 is a view illustrating the internal structure of a cell assembly shown in FIG. 3 with a part of a cell elastic piece included.

Referring to FIG. 7, the battery pack 20 further includes a cell elastic piece 201. The cell elastic piece 201 is disposed on at least one side of the cell assembly 24 to protect the cell assembly 24. The cell assembly has an upper surface, a lower surface, a front end surface, and a rear end surface that are disposed between the upper surface and the lower surface, and a left side surface and a right side surface that are disposed on two sides of a first end surface. The front end surface and the back end surface are disposed opposite to each other. In some examples, the cell elastic piece 201 is disposed around the cell assembly 24. That is, the cell elastic piece 201 is disposed around the upper surface of the cell assembly 24, the lower surface of the cell assembly 24, the front end surface of the cell assembly 24, the rear end surface of the cell assembly 24, the left side surface of the cell assembly 24, and the right side surface of the cell assembly 24 to seal the cell assembly 24 and thus implement functions including water resistance and dust resistance. In some other examples, the cell elastic piece 201 is disposed on two ends of the cell assembly, and at least part of the cell elastic piece 201 seals the tab to cover and secure the tab. With this arrangement, the cell elastic piece 201 is configured to protect the cell assembly 24, to avoid a possible relative displacement between the cells 241 due to a bump or a vibration, and thus to prevent the cells 241 or the tab from being squeezed or kinked. Accordingly, the cell elastic piece 201 can improve the shock-resistant and shock-absorbent performance of the battery pack 20 and thus improve the reliability of the battery pack 20. Moreover, as an elastic piece, the cell elastic piece 201 can better adapt to the expansion property of the battery pack 20. Further, the cell elastic piece 201 can also enhance the heat dissipation performance of the battery pack 20.

In some examples, the cell elastic piece 201 covers and secures the cell assembly 24, the detection circuit board 28, and other connection lines. To enable the cell assembly 24 to output or input electric energy, the positive lead-out piece 243 of the cell assembly 24 and the negative lead-out piece 244 of the cell assembly 24 extend out of the cell elastic piece 201 and protrude from the cell elastic piece 201 to be electrically connected to the battery pack positive terminal 272 and the battery pack negative terminal 273 respectively. In some examples, the cell elastic piece 201 is formed around the cell assembly 24 in the manner of glue injection. Specifically, the cell assembly 24 is disposed in the lower housing 232, and the cell elastic piece 201 is formed on the outer surface of the entire cell assembly 24 in the manner of glue injection to seal the cell assembly 24 and thus implement functions including water resistance and dust resistance.

Figure 8:
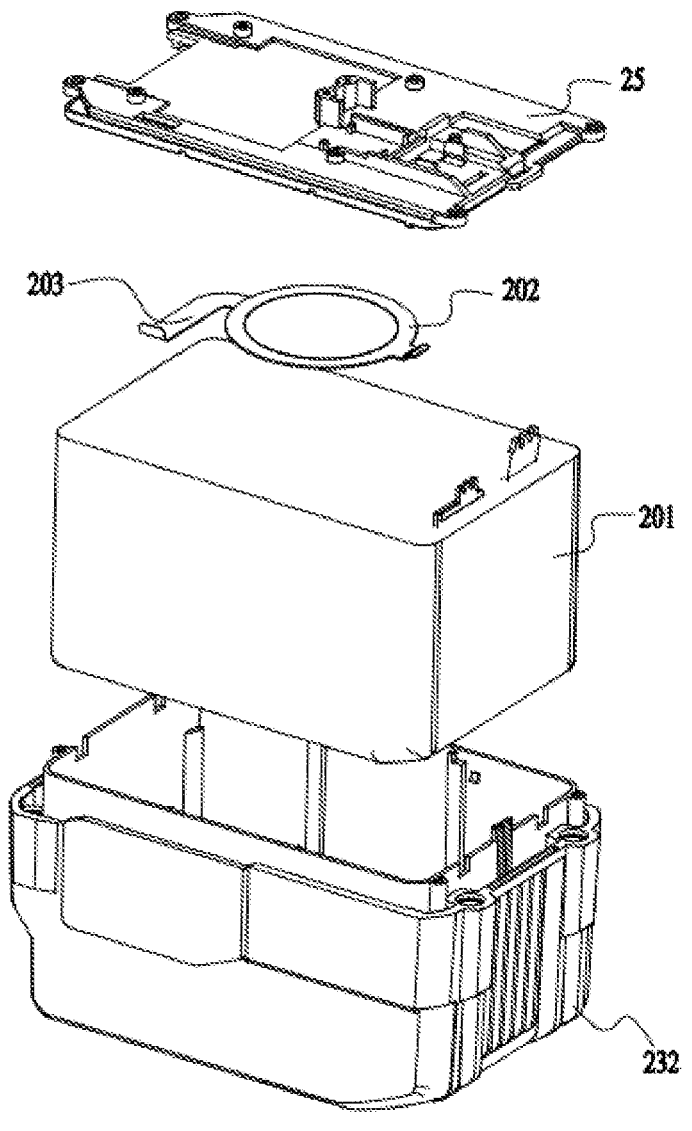
FIG. 8 is a view illustrating the internal structure between a lower housing and a first support plate according to example one.

The battery pack 20 further includes a deformation sensor 202. The deformation sensor 202 is disposed on one side of the cell elastic piece 201 and is configured to detect a parameter related to the deformation amount of the cell assembly 24. Specifically, the deformation sensor 202 is located on the upper side of the cell elastic piece 201 and is spaced apart from the upper surface of the cell elastic piece 201 by a preset distance. Referring to FIG. 8, the deformation sensor 202 is disposed between the cell elastic piece 201 and the first support plate 25. In some examples, the deformation sensor 202 is specifically disposed on the lower surface of the first support plate 25 and is spaced apart from the upper surface of the cell elastic piece 201 by 1 mm to 6 mm. That is, the preset distance is greater than or equal to 1 mm and smaller than or equal to 6 mm.

In this example, the deformation sensor 202 is connected to the main circuit board 26 through a first connection line 203 to output a sensing signal of the deformation sensor 202 to the main circuit board 26. In one example, the deformation sensor 202 serves as a pressure sensor that outputs the sensing signal under pressure. Specifically, when the cell assembly 24 is deformed, for example, when the expansion of the cell assembly 24 causes the first thickness H1 to increase, the cell elastic piece 201 is deformed accordingly and protrudes upward to come into contact with the deformation sensor 202. Sensing the pressure from the cell elastic piece 201, the deformation sensor 202 outputs the sensing signal and transmits the sensing signal through the first connection line to the main circuit board 26. In this case, the deformation sensor 202 and the first connection line are disposed outside the cell elastic piece 201, facilitating maintenance and replacement when the deformation sensor 202 malfunctions.

In one aspect, since the cell assembly 24 may be deformed to a certain degree in normal operation, the preset distance reserved between the deformation sensor 202 and the cell elastic piece 201 guarantees the space for the deformation of the cell assembly 24 in normal operation, thus improving the reliability of the deformation sensor 202 and reducing the probability of false triggering. In another aspect, since the cell elastic piece 201 covers the cell assembly 24 to form an enclosed cavity, the temperature change of the battery pack in operation may cause the air in the enclosed cavity to expand and increase the air pressure in the enclosed cavity. Accordingly, the arrangements in which the deformation sensor 202 is disposed outside the cell elastic piece 201 also help prevent the enclosed cavity formed by the cell elastic piece 201 from affecting the deformation detection of the cell assembly 24, improve the reliability of the deformation sensor 202, and thus improve the safety and reliability of the battery pack. Additionally, the first support plate 25 is disposed between the cell assembly 24 and the main circuit board 26 so that the first support plate 25 can effectively hinder the deformation of the cell assembly 24 even if the cell assembly 24 is deformed, protecting the main circuit board 26 and preventing the deformation of the cell assembly 24 from damaging the main circuit board 26.

Figure 9:
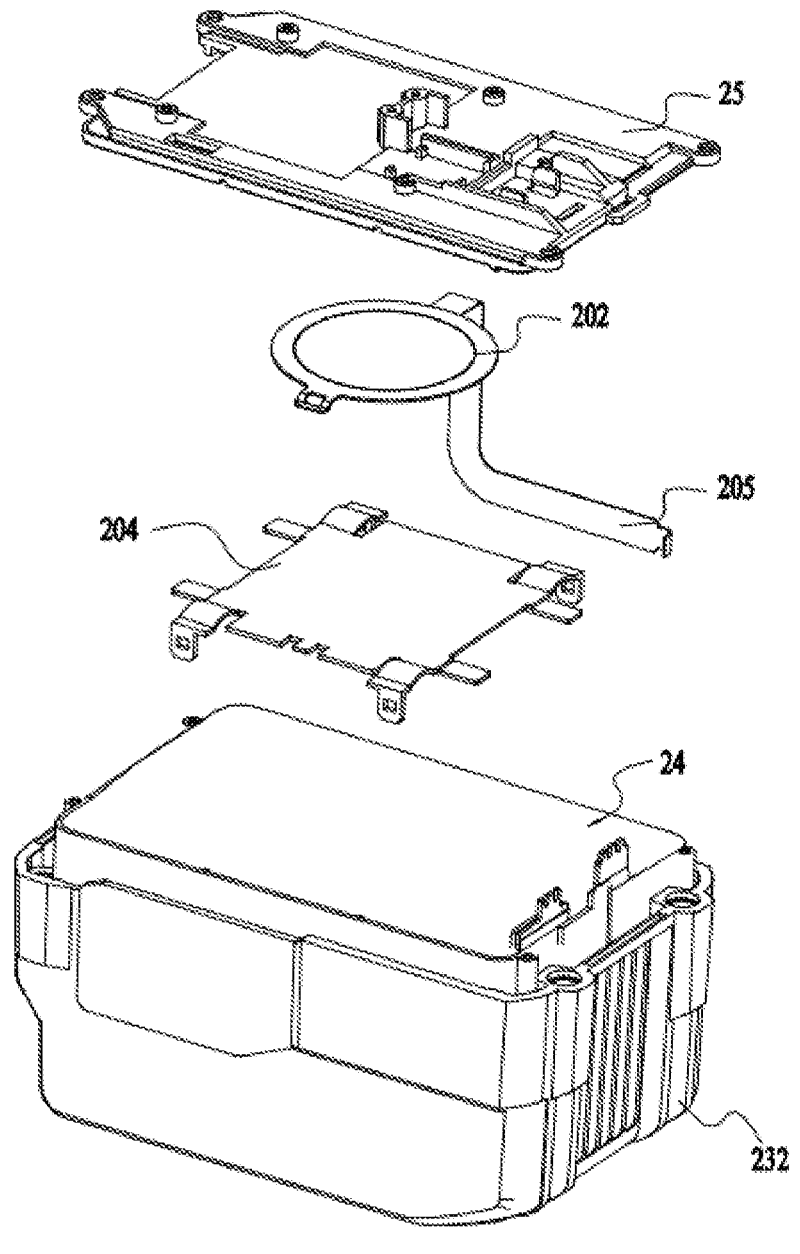
FIG. 9 is a view illustrating the internal structure between a lower housing and a first support plate according to example two.

In some other examples, the battery pack 20 further includes a second support plate 204. The second support plate 204 includes an elastic plate with a certain elastic coefficient. Referring to FIG. 9, the second support plate 204 is disposed between the cell assembly 24 and the first support plate 25 and is configured to support the deformation sensor 202. In this example, the second support plate 204 is securely connected to the lower housing 232 through an elastic arm with a certain elastic coefficient. The second support plate 204 further includes multiple elastic arms detachably connected to the lower housing through screws. It is to be understood that the second support plate 204 may be made of elastic material and is not limited here, as long as the second support plate 204 can be deformed along with the deformation of the cell assembly 24. Specifically, the deformation sensor 202 is disposed on the upper surface of the second support plate 204 and is spaced apart by 1 mm to 6 mm from the upper surface of the cell elastic piece 201 covering the outer surface of the cell assembly 24.

In this example, the deformation sensor 202 is connected to the detection circuit board 28 through a second connection line 205 to output the sensing signal of the deformation sensor 202 to the detection circuit board 28. Specifically, when the cell assembly 24 is deformed, for example, when the expansion of the cell assembly 24 causes the first thickness H1 to increase, the cell elastic piece 201 is deformed accordingly and protrudes upward to come into contact with the second support plate 204. The deformation sensor 202 disposed on the second support plate 204 protrudes upward accordingly till comes into contact with the first support plate 25. Therefore, sensing the pressure from the first support plate 25 and the pressure from the second support plate 204, the deformation sensor 202 outputs the sensing signal and transmits the sensing signal through the second connection line 205 to the detection circuit board 28. The detection circuit board 28 collects the sensing signal and transmits the sensing signal to the main circuit board 26. The specific shape of the preceding first connection line 203 and the specific shape of the preceding second connection line 205 may be arranged based on the specific structure of the battery pack and are not limited here.

Figure 10:
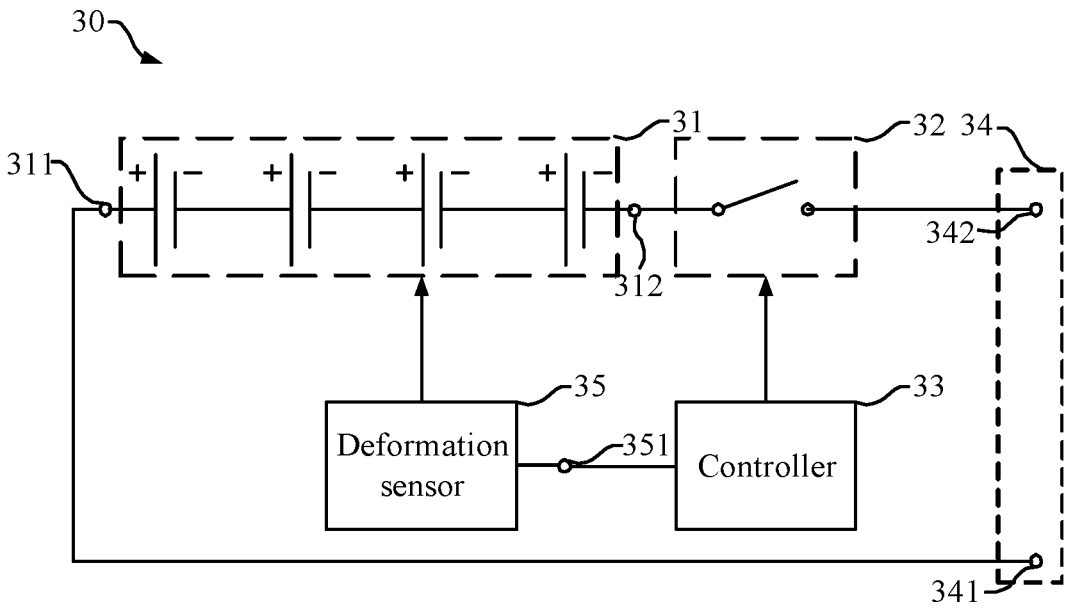
FIG. 10 is a block diagram of a protective circuit provided for the battery pack according to example one.

FIG. 10 is a block diagram of a protective circuit of the battery pack. As shown in FIG. 10, the battery pack protective circuit 30 includes a cell assembly 31, a switch 32, a controller 33, a battery pack positive terminal 341, a battery pack negative terminal 342, and a deformation sensor 35. The battery pack positive terminal 341 and the battery pack negative terminal 342 are disposed in a battery pack interface 34. The cell assembly 31 further includes a cell assembly positive terminal 311 and a cell assembly negative terminal 312.

The switch 32 is connected between the cell assembly 31 and the battery pack interface 34 and is configured to electrically connect the cell assembly 31 to the battery pack interface 34 or electrically disconnect the cell assembly 31 from the battery pack interface 34. The on or off state of the switch 31 is controlled by the controller 33. In some examples, the switch is disposed between the cell assembly positive terminal 311 and the battery pack positive terminal 341. In some other examples, the switch is disposed between the cell assembly negative terminal 312 and the battery pack negative terminal 342. Specifically, the switch 31 is disposed on a circuit board. The switch 31 may be an electronic switch, for example, a metal-oxide-semiconductor transistor (MOS transistor), an insulated-gate bipolar transistor (IGBT), or a relay.

The controller 33 is connected to the deformation sensor 35 and is configured to, when the deformation sensor 35 detects that a parameter related to the deformation amount of the cell assembly 31 satisfies a preset condition, output a control signal for turning off the switch 31 to electrically disconnect the cell assembly 31 from the battery pack interface 34. The deformation sensor 35 includes at least a detection terminal 351. The detection terminal 351 is connected to the controller 33. In some examples, the parameter related to the deformation amount of the deformation sensor 35 and cell assembly 31 is a voltage parameter. Specifically, after the deformation sensor 35 powers on, the output voltage of the detection terminal 351 changes constantly along with the change of the pressure received by the deformation sensor 35. Accordingly, the controller 33 is specifically configured to acquire the voltage of the detection terminal 351 and, when the voltage of the detection terminal 351 is smaller than or equal to a first preset voltage, output the control signal for turning off the switch 31 to electrically disconnect the cell assembly 31 from the battery pack interface 34. In this example, since the resistance of the deformation sensor 35 reduces along with the gradual increase of the received pressure caused by the constant deformation of the cell assembly 31, the voltage of the detection terminal 351 reduces constantly along with the increase of the pressure received by the deformation sensor 35. When the voltage reduces to the first preset voltage, the controller 33 determines the deformation of the cell assembly 31, turns off the switch 31, thus electrically disconnects the cell assembly 31 from the battery pack interface 21, and protects the safety of the battery pack. Specifically, the deformation sensor 35 may be one of a strain gauge pressure sensor, a piezoresistive pressure sensor, a capacitive pressure sensor, a piezoelectric pressure sensor, an inductive pressure sensor, or a Hall effect sensor. Accordingly, based on the selected deformation sensor 335, the parameter that is related to the deformation amount of the cell assembly 31 and is acquired by the controller 33 may also be, for example, a resistance value, a current value, or an inductance value and is not limited here. It is to be understood that the present application includes but is not limited to the disclosed examples. Due to different specific circuits of the deformation sensor 35, the preset condition for the controller 33 controlling the switch 31 to turn on or off may be different. For example, the controller 33 may further be configured to, when the voltage of the detection terminal 351 is greater than or equal to the first preset voltage, output the control signal for turning off the switch 31 to electrically disconnect the cell assembly 31 from the battery pack interface 21 and protect the safety of the battery pack.

Figure 11:
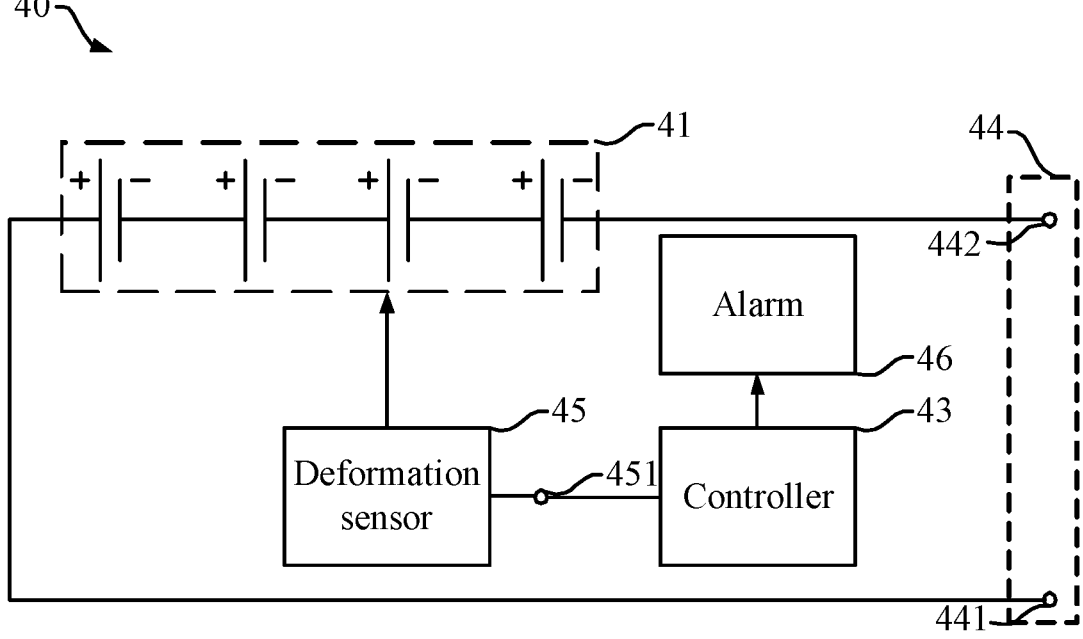
FIG. 11 is a block diagram of a protective circuit provided for a battery pack according to example two.

In some other examples, a battery pack protective circuit 40 includes an alarm 46 that can be triggered to give an alarm. Referring to FIG. 11, a controller 43 is configured to, when a deformation sensor 45 detects that a parameter related to the deformation amount of a cell assembly 41 satisfies the preset condition, output an alarm signal to trigger the alarm 46 to give an alarm. The deformation sensor 45 includes at least a detection terminal 451 connected to a controller 43. The controller 43 is specifically configured to acquire the voltage of the detection terminal 451 and, when the voltage is smaller than or equal to the first preset voltage, output the alarm signal to trigger the alarm 46 to give an alarm. In this example, since the resistance of the deformation sensor 45 reduces along with the gradual increase of the received pressure caused by the constant deformation of the cell assembly 41, the voltage of the detection terminal 451 reduces constantly along with the increase of the pressure received by the deformation sensor 45. When the voltage reduces to the first preset voltage, the controller 43 determines the deformation of the cell assembly 41 and transmits the alarm signal to trigger the alarm 46 to give an alarm. The alarm 46 may specifically be a buzzer. After being triggered to give an alarm, the buzzer buzzes to remind a user that the battery pack has a safety hazard. The alarm 46 may also be another electronic device, for example, an LED light, which can be triggered to flash to remind the user that the cell assembly 41 of the battery pack is deformed and has a safety hazard.

In order to further improve the reliability of the deformation sensor 45, the controller 43 needs to determine whether the deformation sensor 45 is reliable before determining whether the cell assembly 41 is deformed. The controller 43 is configured to acquire the voltage of the detection terminal 451 and, when the voltage is greater than a second preset voltage, output the control signal for turning off a switch to electrically disconnect the cell assembly 41 from a battery pack interface 44. In this example, if the deformation sensor 45 is reliable, the voltage needs to be smaller than or equal to the second preset voltage. If the voltage of the detection terminal 451 is greater than the second preset voltage, it indicates that the deformation sensor 45 is open-circuited. Accordingly, it is determined that the deformation sensor 45 is disabled. To guarantee the safety of the battery pack, the controller 43 turns off the switch and thus electrically disconnects the cell assembly 41 from the battery pack interface 44. On the contrary, if the voltage of the detection terminal 451 is smaller than or equal to the second preset voltage, it indicates that the deformation sensor 45 is reliable. It needs to be further determined whether the voltage is smaller than or equal to the first preset voltage so as to determine whether the cell assembly 41 is deformed. The first preset voltage is smaller than the second preset voltage.

Figure 12:
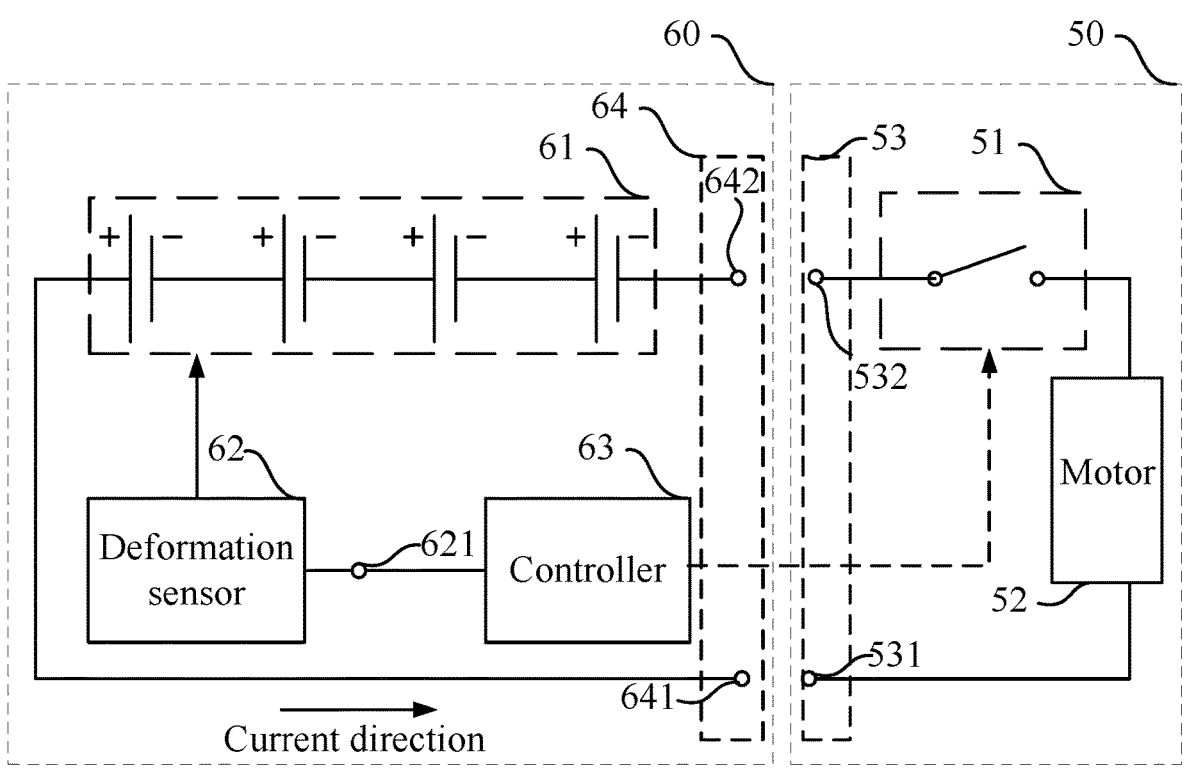
FIG. 12 is a block diagram of a protective circuit provided for the power tool system according to example one.

In some other examples, the switch of the battery pack protective circuit is disposed in a power tool system and is specifically disposed on a discharge circuit. FIG. 12 is a block diagram of a protective circuit of a power tool system according to one example. Referring to FIG. 12, the power tool system includes a power tool 50 and a battery pack 60. The battery pack 60 is attached to the power tool 50. The battery pack positive terminal 272 and the battery pack negative terminal 273 match a tool positive terminal 531 of the power tool and a tool negative terminal 532 of the power tool to output the electric energy of the cell assembly 24 to the power tool. The battery pack communication terminal 274 is connected to a tool communication terminal to communicate with the power tool. In this example, a switch 51 is disposed on a discharge circuit formed by a cell assembly 61, a battery pack interface 64, and a motor 52 of the power tool and is configured at least to turn on or off the electrical connection between the battery pack and the motor 52 of the power tool. The on or off state of the switch 51 is also controlled by a controller 63. Specifically, the controller 63 transmits the control signal for turning off the switch 51 through a battery pack communication terminal 643. The controller 63 is configured to, when the deformation sensor 62 detects that a parameter related to the deformation amount of the cell assembly 61 satisfies the preset condition, output the control signal for turning off the switch 51 to disconnect the discharge circuit and protect the safety of the power tool system. The deformation sensor 62 includes at least a detection terminal 621 connected to the controller 63. The controller 63 is specifically configured to acquire the voltage of the detection terminal 621. When the voltage is smaller than or equal to the first preset voltage, the controller 43 outputs the control signal for turning off the switch 51 to disconnect the discharge circuit. Since the resistance of the deformation sensor 62 reduces along with the gradual increase of the received pressure caused by the constant deformation of the cell assembly 61, the voltage of the detection terminal 621 reduces constantly along with the increase of the pressure received by the deformation sensor 62. When the voltage reduces to the first preset voltage, the controller 63 determines the deformation of the cell assembly 61, turns off the switch 51, thus disconnects the discharge circuit, and protects the safety of the battery pack. It is to be noted that although this example discloses that the switch 51 is disposed in the power tool, the switch 51 may also be disposed in the battery pack and is not limited here.

In order to further improve the reliability of the deformation sensor 62, the controller 63 first determines whether the deformation sensor 62 is reliable before determining whether the cell assembly 61 is deformed. The controller 63 is configured to acquire the voltage of the detection terminal 621 and, when the voltage is greater than the second preset voltage, output the control signal for turning off the switch 51 to disconnect the discharge circuit. In this example, if the deformation sensor 62 is reliable, the voltage needs to be smaller than or equal to the second preset voltage. If the voltage of the detection terminal 621 is greater than the second preset voltage, it indicates that the deformation sensor 62 is open-circuited. Accordingly, it is determined that the deformation sensor 62 is disabled. To guarantee the safety of the battery pack, the controller 43 turns off the switch 51 and thus disconnects the discharge circuit. On the contrary, if the voltage of the detection terminal 621 is smaller than or equal to the second preset voltage, it indicates that the deformation sensor 62 is reliable. It needs to be further determined whether the voltage is smaller than or equal to the first preset voltage so as to determine whether the cell assembly 61 is deformed. The first preset voltage is smaller than the second preset voltage.

Figure 13:
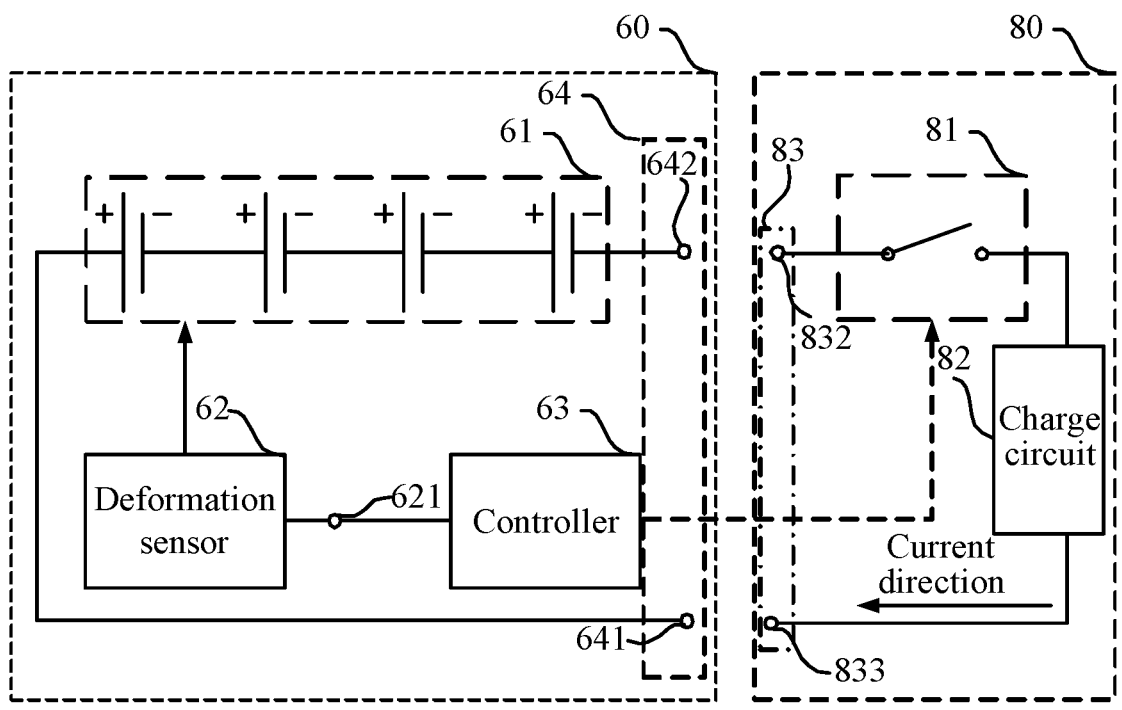
FIG. 13 is a block diagram of a protective circuit provided for a charging combination according to example one.

FIG. 13 is a block diagram of a protective circuit used for a charging combination according to one example. Referring to FIG. 13, the charging combination includes the battery pack 60 and a charger 80.

The charger 80 is configured to charge the battery pack. Exemplarily, the charger 80 includes a charge path 82 and a direct current (DC) output interface 83. The charge path 82 includes an alternating current (AC) input interface and an AC-DC conversion circuit. Specifically, the AC input interface is configured to access AC. In some examples, the AC input interface is connected to a power plug. The power plug is inserted into an AC socket to access AC commercial power. The value range of the AC accessed in the AC input interface is 110 V to 130 V or 210 V to 230 V. The AC-DC conversion circuit is electrically connected to the AC input interface to convert AC to DC. The DC output interface 83 is electrically connected to the AC-DC conversion circuit to output DC. The DC output interface 83 includes a charger positive terminal 831 and a charger negative terminal 832. The charger positive terminal 831 and the charger negative terminal 832 match a battery pack positive terminal 641 and a battery pack negative terminal 642 output electric energy to the cell assembly 61. A charger communication terminal 833 is connected to the battery pack communication terminal 643 to communicate with the battery pack. In this example, a switch 81 is disposed on a charge circuit formed by the cell assembly 61, the battery pack interface 64, and the charge path 82 and is configured at least to electrically connect the battery pack to the charge path 82 or electrically disconnect the battery pack from the charge path 82. The on or off state of the switch is also controlled by the controller 63. Specifically, the controller 63 transmits the control signal for turning off the switch through the battery pack communication terminal 643. The controller 63 is configured to, when the deformation sensor 62 detects that the parameter related to the deformation amount of the cell assembly 61 satisfies the preset condition, output the control signal for turning off the switch to disconnect the charge circuit and protect the safety of the charging combination. The deformation sensor 62 includes at least the detection terminal 621 connected to the controller 63. The controller 63 is specifically configured to acquire the voltage of the detection terminal 621. When the voltage is smaller than or equal to the first preset voltage, the controller 43 outputs the control signal for turning off the switch to disconnect the charge circuit. Since the resistance of the deformation sensor 62 reduces along with the gradual increase of the received pressure, the voltage of the detection terminal 621 reduces constantly along with the increase of the pressure received by the deformation sensor 62. When the voltage reduces to the first preset voltage, it is determined that the cell assembly 61 is deformed. The controller 63 turns off the switch, thus disconnects the charge circuit, and protects the safety of the battery pack. It is to be noted that although this example discloses that the switch is disposed in the charger 80, the switch may also be disposed in the battery pack and is not limited here.

In order to further improve the reliability of the deformation sensor 62, the controller 63 first determines whether the deformation sensor 62 is reliable before determining whether the cell assembly 61 is deformed. The controller 63 is configured to acquire the voltage of the detection terminal 621 and, when the voltage is greater than the second preset voltage, output the control signal for turning off the switch to disconnect the charge circuit. In this example, if the deformation sensor 62 is reliable, the voltage needs to be smaller than or equal to the second preset voltage. If the voltage of the detection terminal 621 is greater than the second preset voltage, it indicates that the deformation sensor 62 is open-circuited. Accordingly, it is determined that the deformation sensor 62 is disabled. To guarantee the safety of the battery pack, the controller 43 turns off the switch and thus disconnects the charge circuit. On the contrary, if the voltage of the detection terminal 621 is smaller than or equal to the second preset voltage, it indicates that the deformation sensor 62 is reliable. It is to be further determined whether the voltage is smaller than or equal to the first preset voltage so as to determine whether the cell assembly 61 is deformed. The first preset voltage is smaller than the second preset voltage.

The above illustrates and describes basic principles, main features, and advantages of the present disclosure. It is to be understood by those skilled in the art that the preceding examples do not limit the present disclosure in any form, and technical solutions obtained by means of equivalent substitution or equivalent transformation fall within the scope of the present disclosure.

What is claimed is:

1. A battery pack for a power tool, comprising:
a housing;
a battery pack interface enabling the battery pack to be detachably connected to the power tool, wherein the battery pack interface is disposed at an upper surface of the housing and the battery pack interface comprises a battery pack positive terminal and a battery pack negative terminal; and
a cell assembly located in the housing, wherein the cell assembly comprises a plurality of non-cylindrical cells stacked in sequence from the upper surface of the housing to a lower surface of the housing, a cell assembly positive terminal, and a cell assembly negative terminal for outputting electric energy of the cell assembly;
a positive lead-out piece, wherein the positive lead-out piece connects the cell assembly positive terminal to the battery pack positive terminal;
a negative lead-out piece, wherein the negative lead-out piece connects the cell assembly negative terminal to the battery pack negative terminal,
wherein a discharge path is formed by the cell assembly positive terminal, the positive lead-out piece, the battery pack positive terminal, the cell assembly negative terminal, the negative lead-out piece, and the battery pack negative terminal and configured to supply power to the power tool;
a protective element disposed on the discharge path, wherein the protective element turns off the discharge path when a discharge current through the discharge path is greater than or equal to a preset current,
wherein the protective element is electrically connected between the negative lead-out piece and the battery pack negative terminal, a length of the negative lead-out piece close to the protective element is greater than a length of the positive lead-out piece away from the protective element, the positive lead-out piece and the negative lead-out piece are disposed at a front side of the plurality of non-cylindrical cells, and the length of the positive lead-out piece is smaller than or equal to the thickness of each of the plurality of non-cylindrical cells, and
wherein the positive lead-out piece has a first temperature when the battery pack is discharged, the negative lead-out piece has a second temperature when the battery pack is discharged, the protective element is disposed between the negative lead-out piece and the battery pack negative terminal, the second temperature is greater than the first temperature.

2. The battery pack of claim 1, wherein the plurality of non-cylindrical cells are connected in series.

3. The battery pack of claim 1, wherein the positive lead-out piece and the negative lead-out piece are made of metal.

4. The battery pack of claim 1, wherein the cell assembly comprises a first cell and a second cell, a positive electrode of the first cell is connected to a negative electrode of the second cell in series, the positive lead-out piece is connected to a positive electrode of the second cell, and the negative lead-out piece is connected to a negative electrode of the first cell.

5. The battery pack of claim 1, wherein the discharge current of the battery pack is greater than or equal to 80 A.

6. The battery pack of claim 1, wherein a capacity of the battery pack is greater than or equal to 5 Ah.

7. The battery pack of claim 1, wherein the battery pack further comprises a cell elastic piece disposed around the cell assembly.

8. The battery pack of claim 1, wherein each of the plurality of non-cylindrical cells is a flat bag-like structure.

9. The battery pack of claim 1, wherein the each of the plurality of non-cylindrical cells comprises a shell and an aluminum-plastic film is used as the shell.

10. The battery pack of claim 9, wherein the battery pack is a pouch-type battery pack.

11. The battery pack of claim 1, wherein a width of the positive lead-out piece is in a range of 5 mm to 40 mm.

12. A battery pack for a power tool, comprising:
a housing;
a battery pack interface enabling the battery pack to be detachably connected to the power tool, wherein the battery pack interface is disposed at an upper surface of the housing, the battery pack interface comprises a battery pack positive terminal and a battery pack negative terminal; and
a cell assembly located in the housing, wherein the cell assembly comprises a plurality of non-cylindrical cells stacked in sequence from the upper surface of the housing to a lower surface of the housing, a cell assembly positive terminal, and a cell assembly negative terminal for outputting electric energy of the cell assembly;
a positive lead-out piece, wherein the positive lead-out piece connects the cell assembly positive terminal to the battery pack positive terminal;
a negative lead-out piece, wherein the negative lead-out piece connects the cell assembly negative terminal to the battery pack negative terminal,
wherein a discharge path is formed by the cell assembly positive terminal, the positive lead-out piece, the battery pack positive terminal, the cell assembly negative terminal, the negative lead-out piece, and the battery pack negative terminal and configured to supply power to the power tool;
a protective element disposed on the discharge path, wherein the protective element turns off the discharge path when a discharge current through the discharge path is greater than or equal to a preset current,
wherein either, the protective element is electrically connected between the positive lead-out piece and the battery pack positive terminal, a length of the positive lead-out piece close to the protective element is greater than a length of the negative lead-out piece away from the protective element, the positive lead-out piece and the negative lead-out piece are disposed at a front side of plurality of non-cylindrical cells, and the length of the positive lead-out piece is smaller than or equal to the thickness of the cell assembly in a direction from the upper end of the cell assembly to the lower end of the cell assembly;

or, the protective element is electrically connected between the negative lead-out piece and the battery pack negative terminal, and a length of the negative lead-out piece close to the protective element is greater than a length of the positive lead-out piece away from the protective element, the positive lead-out piece and the negative lead-out piece are disposed at a front side of plurality of non-cylindrical cells, and the length of the negative lead-out piece is smaller than or equal to the thickness of the cell assembly in a direction from the upper end of the cell assembly to the lower end of the cell assembly.

13. The battery pack of claim 12, wherein the positive lead-out piece and the negative lead-out piece are made of metal.

14. The battery pack of claim 12, wherein the cell assembly comprises a first cell and a second cell, a positive electrode of the first cell is connected to a negative electrode of the second cell in series, the positive lead-out piece is connected to a positive electrode of the second cell, and the negative lead-out piece is connected to a negative electrode of the first cell.

15. The battery pack of claim 12, wherein the discharge current of the battery pack is greater than or equal to 80 A.

16. The battery pack of claim 12, wherein a capacity of the battery pack is greater than or equal to 5 Ah.

17. The battery pack of claim 12, wherein the battery pack further comprises a cell elastic piece disposed around the cell assembly.

18. The battery pack of claim 12, wherein each of the plurality of non-cylindrical cells is a flat bag-like structure.

19. The battery pack of claim 12, wherein the each of the plurality of non-cylindrical cells comprises a shell and an aluminum-plastic film is used as the shell.

* * * * *